United States Patent [19]

Trexler, Sr.

[11] 4,174,691

[45] Nov. 20, 1979

[54] FUEL-AIR SUPPLY SYSTEM FOR INTERNAL COMBUSTION ENGINES

[76] Inventor: Charles H. Trexler, Sr., 6229 Debora Dr., Richmond, Va. 23225

[21] Appl. No.: 872,946

[22] Filed: Jan. 27, 1978

[51] Int. Cl.² ............................................ F02M 31/00
[52] U.S. Cl. ................... 123/133; 123/122 E
[58] Field of Search .............. 123/122 H, 133, 122 E, 123/122 C, 34 A, 121; 261/144, 145

[56] References Cited

U.S. PATENT DOCUMENTS

| | | | |
|---|---|---|---|
| 1,139,081 | 5/1915 | Stone | 123/122 C |
| 1,991,021 | 2/1935 | Leisten | 123/121 |
| 2,285,905 | 6/1942 | Cunningham | 123/121 |
| 2,315,881 | 4/1943 | Thomas | 123/121 |
| 2,315,882 | 4/1943 | Trimble | 123/121 |
| 2,381,304 | 8/1945 | Merrill | 123/121 |
| 3,738,334 | 6/1973 | Farr | 123/133 |
| 3,986,486 | 10/1976 | Rabbiosi | 123/133 |

Primary Examiner—Ronald H. Lazarus
Attorney, Agent, or Firm—Strauch, Nolan, Neale, Nies & Kurz

[57] ABSTRACT

A fuel-air supply system for a combustion engine wherein unmixed supplies of liquid fuel and combustion air are heated and after heating are bypassed around the engine's carburetor for delivery to the engine in place of the fuel air mixture from the carburetor when the temperature of the liquid fuel being heated rises to a preselected temperature.

11 Claims, 10 Drawing Figures

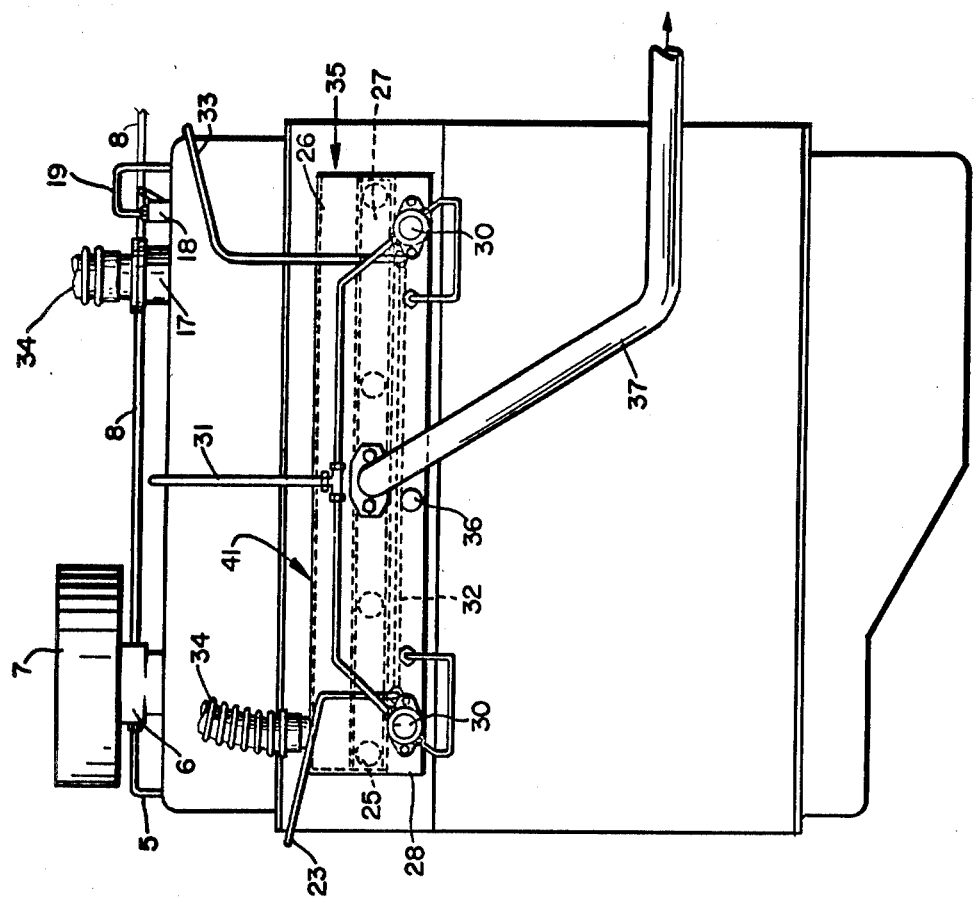
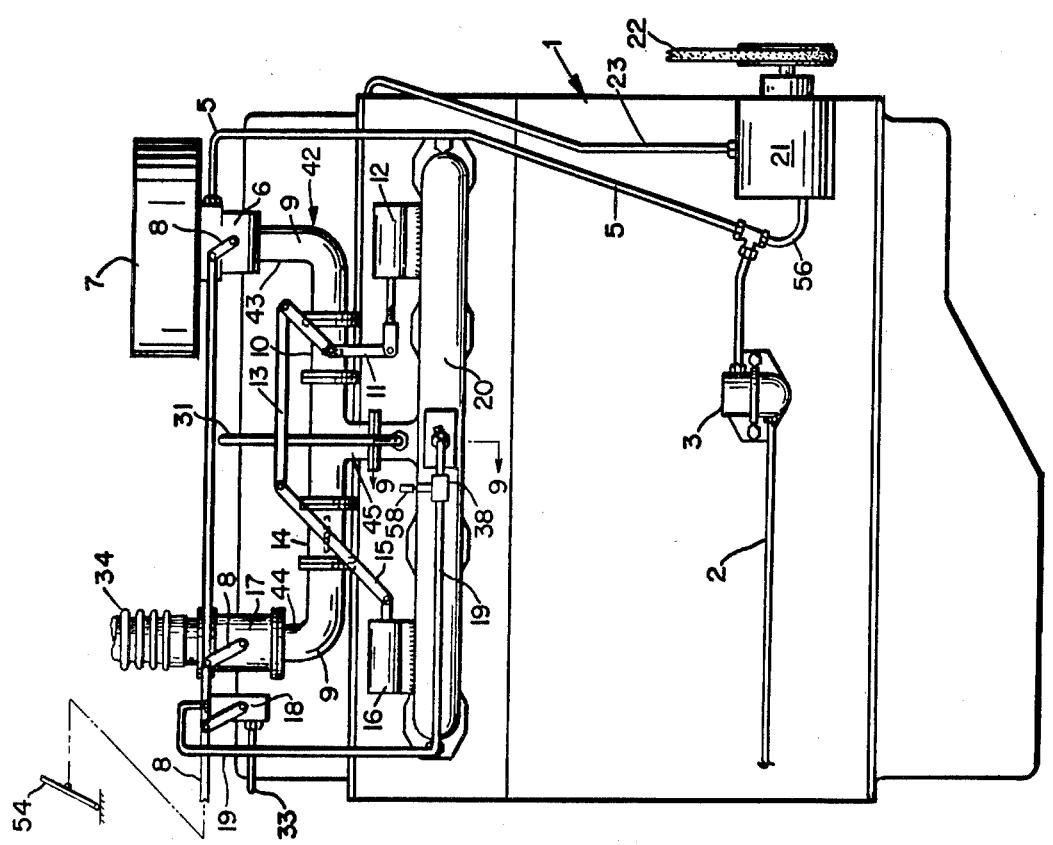
Fig. 3
Fig. 2

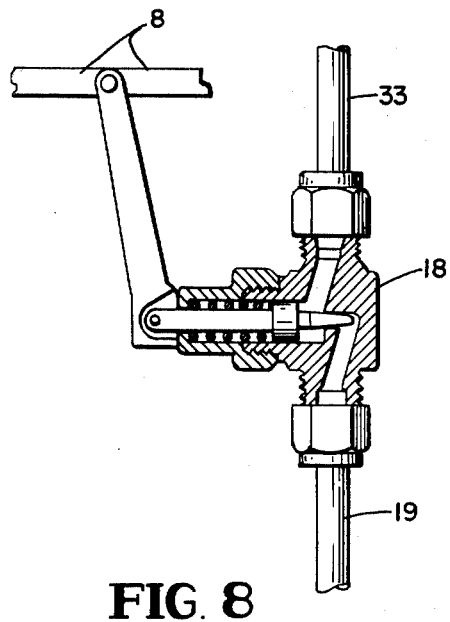
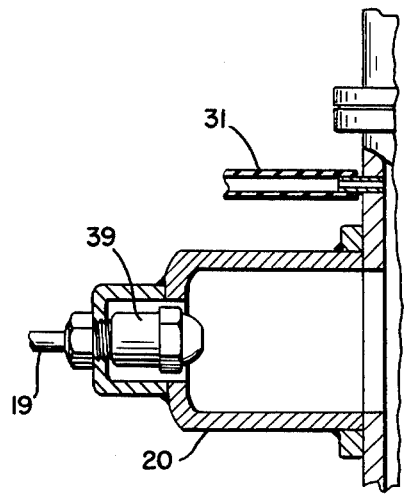
FIG. 8  FIG. 9
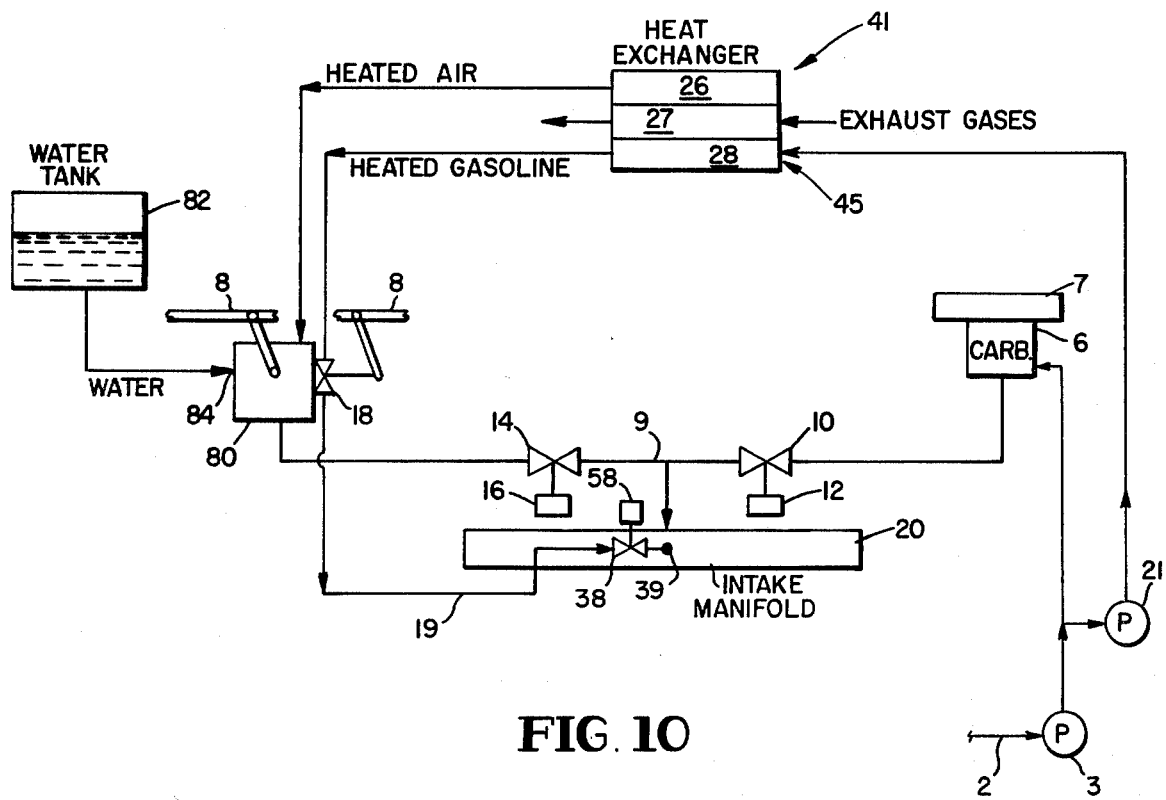
FIG. 10

FUEL-AIR SUPPLY SYSTEM FOR INTERNAL COMBUSTION ENGINES

FIELD OF INVENTION

This invention relates to fuel-air supply systems for internal combustion engines.

BACKGROUND

Prior to this invention various proposals have been made for modifying an internal combustion engine's conventional fuel-air supply system in order to improve fuel economy and/or to reduce engine exhaust emissions. Two examples of such modifications are described in U.S. Pat. No. 3,963,013 which issued to E. C. Authement et al on June 15, 1976 and U.S. Pat. No. 3,738,334 which issued to R. S. Farr on June 12, 1973.

In both of the patents mentioned above liquid gasoline is heated and vaporized before it is introduced into a conventional carburetor along with induction air. This is accomplished by shutting off the normal supply of liquid gasoline to the carburetor when a normal operating temperature is reached and by introducing the heated, vaporized fuel into the air stream just upstream from the carburetor's air inlet port. This type of fuel-air supply system has a number of significant drawbacks.

For one thing, the vaporized gasoline is not pressurized and occupies a relatively large volume. Second, vapor locks can occur more readily because the heated fuel is vaporized even before introduction into the carburetor. Third, re-starting the engine with the liquid fuel supply can be troublesome because the liquid fuel in the carburetor's fuel bowl tends to become depleted during the period when the liquid fuel supply to the fuel bowl is shut off.

The present invention overcomes these drawbacks as well as significantly reducing gasoline consumption and engine exhaust pollutants.

SUMMARY AND OBJECTS OF INVENTION

In the fuel-air supply system of this invention a conventional carburetor is employed and operated in the usual manner to supply a fuel-air mixture to the engine on start-up when the engine is cold. Heat generated by the running engine is used to heat a supply of the liquid fuel and also to heat a supply of combustion air.

As distinguished from the system described in the foregoing patents the heated fuel and heated air in the system of this invention are kept separate and unmixed before entering the engine and are bypassed around the carburetor for introduction into the engine in place of the carburetor's fuel-air mixture when the temperature of heated fuel rises to a predetermined value. Furthermore, the heated liquid fuel is kept under a high enough pressure to ensure that it remains in its liquid state until it enters the engine to avoid vapor locks. Additionally, the supply of liquid fuel to the carburetor's fuel bowl is not shut off as with prior systems when the switch-over is made to the heated supply of fuel and air. As a result the fuel bowl remains adequately filled for trouble-free start-ups.

In the preferred embodiment the heated fuel and heated air are separately introduced into and mixed together within the engine's intake manifold. Upon being admitted to the engine manifold, the pressurized, heated liquid gasoline is converted into a gas by virtue of being first heated to a sufficiently high temperature and then being subjected to the sharp pressure drop to the engine manifold's sub-atmospheric condition.

According to this invention, two separate fluid flow control devices are employed to separately control or vary the flow of heated liquid fuel to the engine and the flow of heated combustion air to the engine. This separate control is made possible because the heated supply of liquid fuel and the heated supply of combustion air are separately conveyed to the engine. This feature affords more effective control over the quantities of heated fuel and heated air admitted to the engine.

In the fuel air system of this invention more hot oxygen can be burned due to the fact that it has a separate source of its own. Thus, less carbon is expelled in the engine's exhaust to reduce pollution. Additionally, engine power is increased by heating the fuel and the air. Increased power and increased burning of oxygen reduces gasoline consumption.

With the foregoing in mind a major object of this invention resides in the provision of a novel fuel-air supply system for reducing fuel consumption and engine exhaust pollution.

Another important object of this invention is to provide a novel fuel-air system in which separate, unmixed, regulated supplies of heated liquid fuel and heated air are bypassed around the engine's regular carburetor and are fed to the engine in place of the fuel-air mixture from the carburetor when a predetermined temperature condition is reached.

In addition to the foregoing, the novel fuel-air system of this invention is relatively uncomplicated, can readily be incorporated into the power plant at the time of manufacture, and can readily be added to existing vehicle combustion engines with relatively little modification to the existing power plant.

Further objects of this invention will appear as the description proceeds in connection with the appended claims and below-described drawings.

DESCRIPTION OF DRAWINGS

FIG. 2 is a left hand side elevation of the fuel-air supply system and engine assembly shown in FIG. 1;

FIG. 3 is a right hand side elevation of the fuel-air supply system and engine assembly shown in FIG. 1;

FIG. 8 is the fragmentary, partially sectioned side elevation of the fuel control valve shown in FIGS. 1 and 2;

FIG. 9 is a section taken substantially along lines 9—9 of FIG. 2; and

FIG. 10 is a schematic of a further embodiment of the fuel-air supply system of this invention.

DETAILED DESCRIPTION

Figure 1:
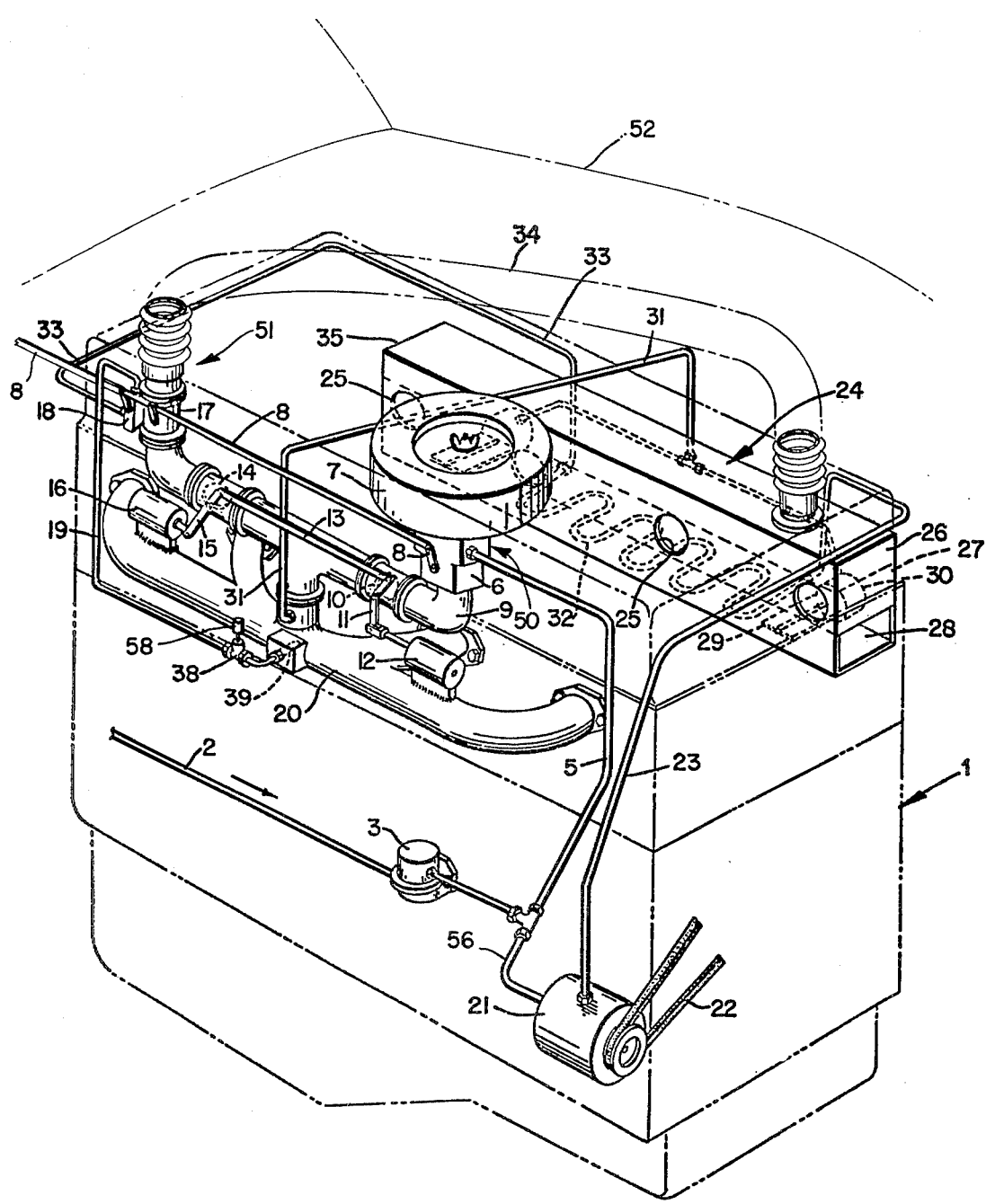
FIG. 1 is a perspective view of a fuel-air supply system incorporating the principles of this invention and showing the internal combustion engine block in phamtom lines.

In accordance with this invention, the internal combustion engine 1 (see FIGS. 1–3) is equipped with two separate air-fuel supply systems, namely a start-up air-fuel supply system 50 and a main or primary air-fuel supply system 51. System 50 is used to supply a fuel-air mixture when the engine is cold or below normal operating temperature, and system 51 is employed to supply unmixed, preheated air and fuel when the engine is warmed up to a normal operating temperature. The start-up air-fuel system 50 is conventional and comprises a carburetor 6, a fuel pump 3, and an air cleaner 7. Engine 1 is additionally equipped with a conventional intake manifold 20 and an exhaust manifold 24. As shown, engine 1 is of the type which is adapted to be mounted in a vehicle 52, such as an automobile, for powering the vehicle.

A fuel line 2 delivers gasoline in liquid form from a suitable, unshown fuel tank to pump 3. A discharge liquid fuel pipe or line 5 connects the outlet pump 3 of the carburetor fuel bowl in carburetor 6 for supplying fuel at a relatively low pressure of about 5 psig to carburetor 6. Air is supplied to carburetor 6 by way of the air cleaner 7 in the usual manner. Carburetor 6, air cleaner 7, pump 3 and manifolds 20 and 24 all form a part of the standard equipment for the internal combustion engine.

As shown in FIGS. 1-3, the main air-fuel supply system 51 comprises an air and fuel preheating unit 41, an air metering valve 17, a separate fuel metering valve 18, a pump 21 and a special intake manifold and valve assembly 42.

As will be described in greater detail shortly, air and fuel are separately supplied to valves 17 and 18, respectively, after being preheated in unit 41. Valve 18 controls the supply of preheated liquid fuel to manifold 20, and valve 17 controls the supply of preheated air to the manifold and valve assembly 42. A manually operated accelerator pedal 54 (FIG. 2) is connected by a suitable throttle linkage 8 to valve 17, valve 18 and the throttle valve in carburetor 6.

As shown in FIGS. 1 and 2, the manifold and valve assembly 42 comprises a special manifold 9 and the two solenoid operated butterfly valves 10 and 14. Manifold 9 is in the form of a Tee fitting having a pair of inlet ports 43 and 44 and an outlet port 45. Inlet ports 43 and 44 respectively communicate with the outlet port of carburetor 6 and the outlet port or end of valve 17. The outlet port 45 of manifold 9 communicates with the single inlet port of the main manifold 20.

Valve 10 is disposed in one arm portion of manifold 9 between inlet port 43 and outlet port 45, and valve 14 is disposed in the other arm portion of manifold 9 between inlet port 44 and outlet port 45. Valve 10 therefore controls the supply of the air and fuel mixture from carburetor 6 to the main manifold 20, while valve 14 controls the supply of preheated air, unmixed with fuel, from metering valve 17 to the main manifold 20.

As will be described in detail shortly, valves 10 and 14 are operated in a complimentary fashion such that when one is open the other will be closed.

Figure 4:
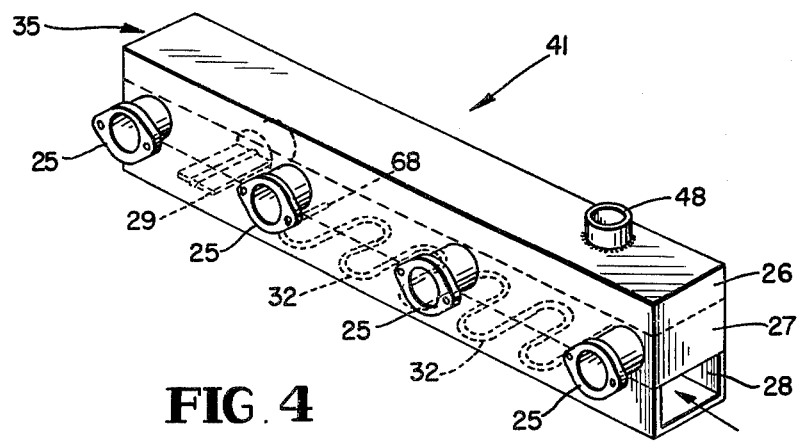
FIG. 4 is a perspective view of the heat exchanger apparatus shown in FIG. 3.
Figure 5:
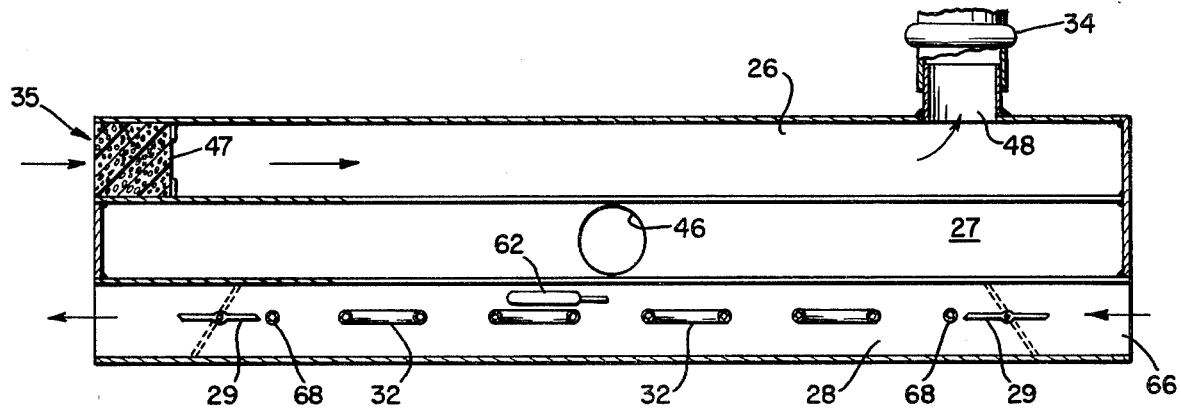
FIG. 5 is a section taken along lines 5—5 of FIG. 4.

As shown in FIGS. 3-5, the preheating unit 41 is a heat exchanger having three separate chambers 26, 27 and 28. Engine exhaust gases passing out of the engine's exhaust manifold 24 flow through chamber 27 by way of exhaust inlet ports 25 and an exhaust outlet port 46 (see FIG. 5) which connects to an exhaust pipe 37 (FIG. 3). Chamber 27 is disposed between chambers 26 and 27 so that the heat of the exhaust gases flowing through chamber 27 is transferred through the chamber walls to both chamber 26 and chamber 28.

Chamber 26 is employed to heat the air which is supplied to the air metering valve 17. As shown in FIG. 5, chamber 26 has an air intake opening 35 at one end and a hot air outlet 48 remote from the air intake or inlet end 35. Outlet 48 is connected by a flexible hose 34 to valve 17 for feeding the heated air from chamber 26 to valve 17. An air filter 47 of suitable material is disposed in the air inlet 35 for filtering the outside air that enters chamber 26.

As shown in FIGS. 1 and 3, pump 3, in addition to feeding liquid fuel to carburetor 6, also supplies fuel in liquid form to pump 21 by way of a liquid fuel inlet pipe 56. The outlet of pump 21 is connected by a liquid fuel discharge line 23 to the inlet end of the fuel heating pipe section or coil 32. Coil 32 is disposed in the heat exchanger chamber 28 between two thermostatically controlled butterfly valves 29. The outlet end of the fuel preheating coil 32 is connected by a hot liquid fuel line pipe 33 to the inlet end of the fuel metering valve 18. The outlet port of the fuel metering valve 18 is connected by a liquid fuel line 19 to a spray nozzle 39 which is disposed in intake manifold 20. A solenoid operated shuft-off valve 38 is disposed in line 19 between metering valve 18 and nozzle 39 to control the supply of metered heated liquid fuel to nozzle 39.

Fuel delivered from pump 21 flows through coil 32 where it is heated by the transfer of heat from the exhaust gases flowing through chamber 27. From coil 32 the preheated fuel passes through valve 18 which is operated to control the amount of fuel delivered through the solenoid operated valve 38 to the spray nozzle 39 in manifold 20.

Pump 21 may be powered from the engine by a belt drive indicated at 22 in FIG. 1 and is of a conventional dual unit type having an internal bypass such as a Sunstrand dual unit pump to maintain a steady, relatively high, pre-selected or preset pressure (e.g, in the range of 10 to 100 psig) at all times during operation to prevent the hot liquid gasoline from vaporizing before it is discharged from nozzle 39 into intake manifold 20. Accordingly, the fuel flowing through coil 32, metering valve 17, and the solenoid operated shut-off valve 39 to nozzle 39 will be unvaporized and in its liquid form. The hot liquid fuel upon being discharged from nozzle 39 immediately gasifies in manifold 20 for mixing with the hot air supplied through manifold 9 from metering valve 17 as will be described in greater detail shortly. Nozzle 39 may be sized to pass just one half gallon of liquid per hour at 100 psig pressure.

As shown in FIGS. 1 and 2 valves 10, 14, and 38 are operated by solenoids 12, 16 and 58 respectively. Solenoids 12, 16 and 58 are connected to solenoid energizing circuit 60 (see FIG. 7) and are under the control of a thermostat or thermostatic control 36 (see FIGS. 2 and 7). Thermostat 36 has a temperature sensing bulb 62 (see FIG. 5) strapped to coil 32 in chamber 28 to sense the temperature of the liquified gasoline which is heated as it flows through coil 32.

Figure 7:
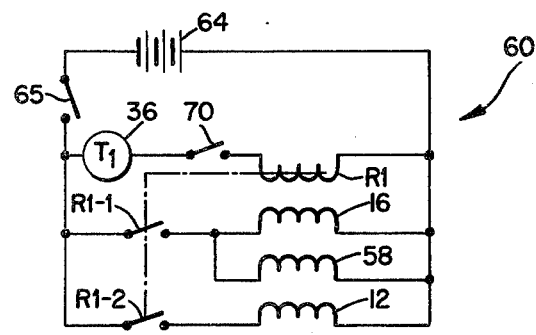
FIG. 7 is a schematic circuit diagram of the temperature-responsive control circuit for this invention.

Thermostat 36 has thermostatically operated switch contacts in series with the coil of a relay R1 as shown in FIG. 7. Current for energizing relay R1 as well as solenoids 16, 58 and 12 may conveniently be supplied by the vehicle's storage battery 64 through the vehicle's ignition switch 65.

As shown in FIGS. 1 and 2, solenoid 12 is connected by a linkage 11 to the operator for valve 10, and solenoid 16 is connected by a linkage 15 to the operator for valve 14. The valve operators or closure members of valves 10 and 14 may further be interconnected by a linkage 13. Linkage 13 ensures that valves 10 and 12 will work in reverse of one another. Valve 10 will therefore be closed when valve 12 is opened, and valve 12 will be closed when valve 10 is opened.

As shown in FIG. 7, relay R1 has a set of normally open contacts R1-1 and a set of normally closed contacts R1-2. Solenoids 16 and 58 are connected in parallel with each other and in series with contacts R1-1. Accordingly, when contacts R1-1 close, solenoids 16 and 58 will be energized simultaneously. Energization of solenoid 16 opens valve 14, and energization of solenoid 58 opens valve 38.

Still refering to FIG. 7, contacts R1-2 are connected in series with solenoid 12 so that when contacts R1-2 close, solenoid 12 will energize. Energization of solenoid 12 opens valve 10. When solenoid 12 is de-energized by opening contacts R1-2, valve 10 will close. Likewise, when solenoids 16 and 58 are de-energized by opening contacts R1-1, valves 14 and 38 will close.

The automatic switch-over from the start-up air-fuel supply system 50 to the normal engine temperature air-fuel supply system 51 occurs at a pre-selected temperature of the heated fuel in coil 32 as determined by the thermostatic control 36. The fuel temperature at which the switch-over takes place is selected to be at least 100° F. (the temperature at which gasoline vaporises at atmospheric pressure) and preferable in the range between 100° F. and 600° F.

As best shown in FIG. 5, chamber 28 is open at its opposite ends, and valves 29 are located in chamber 28 in the manner shown to control the flow of outside air through chamber 28.

As shown, the inlet end of chamber 28 is indicated at 66 in FIG. 1 and opens towards the forward end of engine 1 where the unshown engine fan is located. When valves 29 are open, cool air driven from the engine's unshown fan will flow through chamber 28 in the direction of the illustrated arrows and thus over coil 32 to prevent overheating of the liquid gasoline in coil 32. Valves 29, as will be explained in greater detail shortly, are closed on cold start-up to promote rapid heating of the fuel in coil 32.

Figure 6:
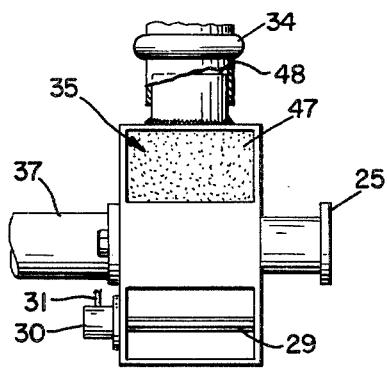
FIG. 6 is a section taken substantially along lines 6—6 of FIG. 3.

As shown in FIGS. 3 and 6, each of the valves 29 is connected to and operated by a thermostatic control element 30. Air which is heated in chamber 29 is drawn through ports 68 (see FIG. 5) and over each of the thermostatic control elements 30 by means of a vacuum line 31 (see FIGS. 1–3). As shown, vacuum line 31 connects between the housings or casings for the thermostatic controls 30 and manifold 20. Thus, when engine 1 is operating to create a vacuum in manifold 20 a small portion of the heated air in chamber 28 will be drawn over the thermostatic control elements 30 and through vacuum line 31 to manifold 20.

For cold start-ups, the engine temperature, or more particularly the engine exhaust gas temperature in chamber 27 will normally be below the temperature at which the thermostatic control 36 closes to energize relay R1. Accordingly, under this cold start-up condition, relay R1 will be deenergized. Contacts R1-1 will therefore be open to prevent energization of solenoids 16 and 58, and contacts R1-2 will be closed to complete the energizing circuit for solenoid 12. As a result, the air supply valve 14 and the fuel supply valve 38 will be closed, and valve 10 will be open. Additionally, valves 29 will be in their closed positions to block the flow of cool air through chamber 28.

Accordingly, the fuel-air mixture furnished by carburetor 6 will be supplied through valve 10 and manifolds 9 and 20 to the piston chambers in engine 1. The operation of the engine results in the flow of hot exhaust gases through chamber 27 to heat the air in chamber 28 and thus the liquified gasoline in coil 32.

The thermostatic controls 30 may be set to cause valves 29 to begin to open as the rising air temperature in chamber 28 approaches the pre-set temperature at which the thermostatic control 36 effectuates the switch-over from the start-up system 50 to the main system 51. As valves 29 open, they allow cool air to pass through chamber 28 to prevent overheating of the gasoline in coil 32. The extent to which valves 29 open is determined and regulated by the temperature sensed by the thermostatic control elements 30. This control is designed to allow the temperature of the gasoline in coil 32 to rise to the value set by the thermostatic control 36 without excessive overheating.

When the temperature sensed by the temperature sensing bulb 62 in chamber 28 reached the temperature at which the thermostatic control 36 is set, the switch contacts in the thermostatic control 36 close to complete the energizing circuit for relay R1. Relay R1 therefore energizes, closing contacts R1-1 and opening contacts R1-2. Solenoids 16 and 58 therefore energize to open valves 14 and 38 respectively, and solenoid 12 de-energizes to close valve 10.

Closure of valve 10 blocks the delivery of the fuel-air mixture from carburetor 6 to the engine intake manifold 20. Opening of valve 14 enables the vacuum created in intake manifold 20 to draw heated air through the heat exchanger chamber 26, hose 34, the air metering valve 17 and valve 14 into the intake manifold 20. At the same time, the opening of valve 38 enables heated gasoline to be pumped through coil 32, the fuel metering valve 18, the shut off valve 38 and nozzle 39 for mixture with the hot air drawn in through manifold 9 by way of valve 14. The heated gasoline is sprayed by the nozzle into intake manifold 20 and immediately gasifies upon entering manifold 20. As shown, nozzle 39 is located immediately below and adjacent to the intake end of manifold 20 so that the gasified gasoline introduced into manifold 20 intimately mixes with the heated air that is drawn into the manifold through valves 17 and 14.

As long as the engine 1 remains at its normal operating temperature, the fuel-air mixture will be supplied separately to intake manifold 20 by way of metering valves 18 and 17 respectively. The regulation of valves 17 and 18 is under the control of the operator's accelerator pedal 54 as previously mentioned. Since the regulation of the pre-heated air and the regulation of pre-heated fuel are accomplished independently of each other by valves 17 and 18, respectively, the regulation may be adjusted in such a way that the percentage of air increases and the percentage of gas introduced decreases as the speed of the vehicle increases by depression of the accelerator pedal 54. Such regulation improves gasoline mileage and reduces pollution.

The significant pressurization of the liquid fuel supplied by pump 21 prevents occurrance of vapor locks due to the preheating of the fuel. The pressurized fuel supplied by air-fuel supply system 51 permits effective and efficient use of relatively low compression engines. Additionally, lower octane fuels may be used efficiently without damage to the engine.

Vacuum line 31 is relatively small so that the amount of air drawn in through line 31 does not significantly affect operation of the engine.

If the temperature in chamber 28 begins to drop toward the desired, pre-selected temperature at which thermostatic control 36 is set, the thermostatic elements 30 close valves 29 more to reduce the amount of air flowing through chamber 28. As a result, the temperature in chamber 28 is maintained at or above the temperature to which the thermostatic control is set.

With the dual air-fuel supply system of this invention it will be noted that fuel is continuously supplied to carburetor 6 by pump 3 even when system 51 is in operation and the start-up system 50 is inoperative. Accordingly, carburetor 6 will always remain wet (i.e., the carburetor's fuel bowl will remain filled) so that carburetor 6 will be effective to re-supply a fuel air mixture to manifold 20 immediately upon switch-over from system 51 to system 50 or upon cold engine start-up.

Advantageously, a manually operated switch 70 (see FIG. 7) is connected in series with the thermostatic control 36 and relay R1. Switch 70 is normally closed, thus placing relay R1 under the control of thermostatic control 36. However, it desired, the operator may manually open switch 70 to de-energize relay R1 and to thereby selectively switch back to the start-up system 50 in which fuel air mixture is supplied by carburetor 6.

It will be appreciated than upon turning engine 1 off, the temperature in chamber 28 will fall, and when it drops below the temperature at which the thermostatic control 36 is set, relay R1 is de-energized to switch the power plant back to the start-up system 50 in readiness for the next start-up.

The embodiment shown in FIG. 10 is the same as the one illustrated in FIGS. 1–9 except that the air metering valve 17 is replaced by a carburetor-like device 80. Device 80 has its air inlet connected to chamber 26 to receive preheated air therefrom. The outlet of device 80 is connected to valve 14 as shown.

Device 80 may be similar in construction to carburetor 6 or any other suitable, conventional carubretor, but instead of having its fuel inlet connected to the fuel source, it is connected to a water tank 82. Water in tank 82 is thus fed to the jet 84 in device 80 so that a jet stream of the water will be drawn into device 80 by the flow of the preheated air through the device.

Since the air drawn through device 80 is heated, the water discharged through jet 84 into the air stream will promptly vaporize upon entering the heated air stream, thus producing hydrogen which is drawn with the heated air into manifold 20. The additional hydrogen advantageously increases engine power and reduced the change of piston pitting. The quantity of water drawn in by the operation of device 80 may be controlled by the selected size of jet 84.

In the foregoing embodiments the liquid fuel supplied by system 51 is preferably heated to a high enough temperature to enable it to be converted into a gas upon entering manifold 20 where it is subjected to the sharp drop in pressure to the manifold's vacuum condition.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fuel-air supply system for supplying fuel and combustion air to an internal combustion engine and comprising carburetor means providing a unheated supply of fuel and air for said engine, further means for heating unmixed liquid fuel and combustion air to provide a heated supply of liquid fuel and combustion air in which the heated fuel and heated air are unmixed, and means responsive to the temperature of the liquid fuel being heated by said further means for (a) passing the supply of fuel and air from said carburetor means to said engine while blocking the supply of fuel and air from said further means to said engine when the temperature of the fuel being heated by said further means is less than a predetermined value and (b) for passing the heated liquid fuel and heated air from said further means to said engine without intermixing the heated liquid fuel and heated air while blocking the unheated supply of fuel and air from said carburetor means when the temperature of the fuel being heated by said further means becomes equal to or greater than said predetermined value.

2. A fuel-air supply system for supplying fuel and combustion air to an internal combustion engine and comprising a carburetor for supplying a mixture of fuel and air to said engine, throttle means connected to said carburetor for controlling the amount of fuel delivered to said engine by said carburetor, pump means adapted to be connected to a source of liquid fuel for supplying liquid fuel to said carburetor, first conduit means connected intermediate said pump means and said engine for bypassing liquid fuel around said carburetor and for conveying the bypassed fuel to said engine, a fuel flow control device connected in said first conduit means between said pump means and said engine, said fuel flow control device being connected to and operated by said throttle means for varying the amount of fuel conveyed by said first conduit means to said engine, heat exchanger means for heating combustion air and further for heating the liquid fuel passing through said first conduit means to at least a predetermined temperature, second conduit means connected intermediate said heat exchanger means and said engine for bypassing the heated air around said carburetor and for conveying the bypassed air to said engine, an air flow control device connected in said second conduit means, said air flow control device being connected to and operated by said throttle means for varying the amount of the heated combustion air conveyed to said engine by said second conduit means, and means sensitive to the temperature of the liquid fuel heated by said heat exchanger means for (a) passing said fuel-air mixture from said carburetor to said engine while blocking the supply of fuel and air to said engine by way of said first and second conduit means when the temperature of the fuel being heated by said heat exchanger means is below said predetermined value and (b) for enabling the fuel and air heated by said heat exchanger means to be conveyed to said engine by said first and second conduit means, while blocking the supply of the fuel air mixture from said carburetor when the temperature of the fuel heated by said heat exchanger means becomes equal to or greater than said predetermined value.

3. The fuel-air supply system defined in claim 2 wherein said heat exchanger means heats the liquid fuel to a temperature that is high enough to cause the fuel to gasify upon entering said engine.

4. The fuel-air supply system defined in claim 2 wherein said first conduit terminates in a nozzle for spraying the heated liquid fuel into the intake manifold of said engine, and wherein said second conduit means is connected to said intake manifold to convey the heated combustion air into said intake manifold.

5. The fuel-air supply system defined in claim 2 comprising means connected to said first conduit means for pressurizing the heated fuel sufficiently to keep it from vaporizing before entering said engine.

6. The fuel-air supply system defined in claim 5 wherein said temperature sensitive means comprises a thermostatic control having an element for sensing the temperature of the fuel being heated by said heat exchanger means, a first valve connected between said carburetor and said engine and controlled by said thermostatic control to block the flow of the fuel-air mixture from said carburetor to said engine only when the temperature of the fuel being heated by said heat exchanger means become equal to or greater than said predetermined value, a second valve connected in said first conduit means, and a third valve connected in said second conduit means, said second and third valves being controlled by said thermostatic control to allow the heated supply of fuel and air to be conveyed to said engine only when the temperature of the heated fuel becomes equal to or greater than said predetermined value.

7. The fuel-air supply system defined in claim 6 wherein said heat exchanger means has a combustion air heating chamber and a fuel heating chamber separate from said air heating chamber, said second conduit means communicating with said air heating chamber for conveying air from said air heating chamber to said engine, said first conduit means having a fuel line extending through said fuel heating chamber, and means forming a part of said heat exchanger means for transferring heat from said engine to said air heating and fuel heating chambers for heating air flowing through said air heating chamber and fuel flowing through said fuel line.

8. The fuel-air supply system defined in claim 7 wherein said fuel heating chamber is provided with an air inlet port and an air outlet port to provide for the flow of ambient air through said fuel heating chamber to remove heat therefrom and to thereby avoid overheating of the fuel flowing through said fuel line, and means responsive to the air temperature in said fuel heating chamber for controlling the flow of air through said fuel heating chamber.

9. The fuel-air supply system defined in claim 8 wherein said heat-transferring means of said heat exchanger means includes third chamber disposed in heat exchange relation with said first and second chambers and connected to the exhaust manifold of said engine to provide for the flow of hot engine exhaust gases therethrough.

10. The fuel-air supply system defined in claim 2 wherein said pump means comprises a first pump connected to feed liquid fuel to said carburetor, there being an additional pump fed by said first pump and connected to said first conduit means to feed liquid fuel to said first conduit means at a pressure that is high enough to prevent vaporization of the heated fuel flowing in said first conduit means.

11. The fuel-air supply system defined in claim 2 wherein said air flow control device has means adapted to be connected to a source of water for introducing water into the stream of heated combustion air flowing through said air flow control device, the combustion air being sufficiently heated by said heat exchanger means to cause vaporization of the introduced water.

* * * * *